US011825357B2

(12) United States Patent
Faxén et al.

(10) Patent No.: US 11,825,357 B2
(45) Date of Patent: Nov. 21, 2023

(54) UE CONTEXT FORWARDING

(71) Applicant: Telefonaktiebolaget LM Ericsson (publ), Stockholm (SE)

(72) Inventors: Linnea Faxén, Linköping (SE); Stefan Engström, Linköping (SE); Stefan Johansson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 145 days.

(21) Appl. No.: 17/270,009

(22) PCT Filed: Aug. 22, 2018

(86) PCT No.: PCT/SE2018/050846
§ 371 (c)(1),
(2) Date: Feb. 20, 2021

(87) PCT Pub. No.: WO2020/040673
PCT Pub. Date: Feb. 27, 2020

(65) Prior Publication Data
US 2021/0185570 A1 Jun. 17, 2021

(51) Int. Cl.
*H04W 76/19* (2018.01)
*H04W 36/00* (2009.01)
(Continued)

(52) U.S. Cl.
CPC .. *H04W 36/0033* (2013.01); *H04W 36/00835* (2018.08); *H04W 36/32* (2013.01);
(Continued)

(58) Field of Classification Search
CPC . H04W 12/06; H04W 24/10; H04W 36/0033; H04W 74/0833; H04W 76/18; H04W 76/19; H04W 76/27
(Continued)

(56) References Cited

U.S. PATENT DOCUMENTS

2020/0029262 A1* 1/2020 Kim ............... H04W 74/0833
2020/0214070 A1* 7/2020 Ingale ............ H04W 74/0833
(Continued)

FOREIGN PATENT DOCUMENTS

WO 2017119723 A1 7/2017
WO WO-2018028455 A1 * 2/2018 ............ H04W 36/00

OTHER PUBLICATIONS

Huawei, R2-1805315, MSG3 verification in target gNB, 3GPP TSG-RAN WG2 (Year: 2018).*

(Continued)

*Primary Examiner* — Harun Chowdhury
(74) *Attorney, Agent, or Firm* — Withrow & Terranova, PLLC

(57) ABSTRACT

The invention relates to methods and devices for enabling a connection of a wireless communication device released by a source radio base station to be resumed by a target radio base station. In a first aspect, a method of a source radio base station of enabling a connection of a wireless communication device released by the source radio base station to be resumed by a target radio base station is provided. The method comprises acquiring an indication that a connection established with the wireless communication device is to be released, identifying a target base station with which the connection to be released can be resumed for the wireless communication device, and transmitting, to the identified target base station, information required to resume the connection to be released by the source base station for the wireless communication device.

15 Claims, 6 Drawing Sheets

(51) Int. Cl.
- H04W 76/30 (2018.01)
- H04W 76/11 (2018.01)
- H04W 36/32 (2009.01)

(52) U.S. Cl.
CPC ............ H04W 76/11 (2018.02); H04W 76/19 (2018.02); H04W 76/30 (2018.02)

(58) Field of Classification Search
USPC .................................. 370/310, 328, 329, 331
See application file for complete search history.

(56) References Cited

U.S. PATENT DOCUMENTS

| | | | |
|---|---|---|---|
| 2020/0281038 A1* | 9/2020 | Fujishiro | H04W 76/19 |
| 2020/0351723 A1* | 11/2020 | Kim | H04W 76/27 |

OTHER PUBLICATIONS

English Translation of WO2018028455 (Year: 2018).*

Author Unknown, "Technical Specification Group Services and System Aspects; Procedures for the 5G System; Stage 2 (Release 15)," Technical Specification 23.502, Version 15.2.0, 3GPP Organizational Partners, Jun. 2018, 308 pages.

Author Unknown, "Technical Specification Group Radio Access Network; Evolved Universal Terrestrial Radio Access Network (E-UTRAN); X2 application protocol (X2AP) (Release 15)," Technical Specification 36.423, Version 15.1.0, 3GPP Organizational Partners, Mar. 2018, 354 pages.

Author Unknown, "Technical Specification Group Radio Access Network; NR; NR and NG-RAN Overall Description; Stage 2 (Release 15)," Technical Specification 38.300, Version 0.6.0, 3GPP Organizational Partners, Aug. 2017, 58 pages.

Author Unknown, "Technical Specification Group Radio Access Network; NR; NR and NG-RAN Overall Description; Stage 2 (Release 15)," Technical Specification 38.300, Version 15.1.0, 3GPP Organizational Partners, Mar. 2018, 71 pages.

Author Unknown, "Technical Specification Group Radio Access Network; NG-RAN; Xn application protocol (XnAP) (Release 15)," Technical Specification 38.423, Version 0.7.0, 3GPP Organizational Partners, Mar. 2018, 81 pages.

China Telecom et al., "RP-170264: Rel-15 Further mobility enhancement for EUTRAN," Third Generation Partnership Project (3GPP), TSG RAN Meeting #75, Mar. 6-9, 2017, 8 pages, Dubrovnik, Croatia.

Huawei, "R2-1805315: MSG3 verification in target gNB," Third Generation Partnership Project (3GPP), TSG-RAN WG2 101-bis, Apr. 16-20, 2018, 2 pages, Sanya, China.

LG Electronics Inc., "R2-1805980: Security of ResumeRequest message," Third Generation Partnership Project (3GPP), TSG-RAN WG2 Meeting #101bis, Apr. 16-20, 2018, 3 pages, Sanya, China.

ZTE et al., "R2-1712615: Consideration on periodic RAN area update procedure," Third Generation Partnership Project (3GPP), TSG-RAN WG2 Meeting#100, Nov. 27-Dec. 1, 2017, 5 pages, Reno, USA.

International Search Report and Written Opinion for International Patent Application No. PCT/SE2018/050846, dated Oct. 16, 2018, 17 pages.

* cited by examiner

UE CONTEXT FORWARDING

This application is a 35 U.S.C. § 371 national phase filing of International Application No. PCT/SE2018/050846, filed Aug. 22, 2018, the disclosure of which is incorporated herein by reference in its entirety.

TECHNICAL FIELD

The invention relates to methods and devices for enabling a connection of a wireless communication device released by a source radio base station to be resumed by a target radio base station.

BACKGROUND

The third generation partnership project (3GPP) is currently working on standardization of the 5th generation of mobile radio access system, also called Next Generation Radio Access Network (NG-RAN). The NG-RAN may include nodes providing radio connections according to the standard for New Radio (NR), as well as nodes providing radio connections according to the Long-Term Evolution (LTE) standard.

The NG-RAN needs to be connected to a network that provides non-access stratum functions, i.e. functions for managing establishment of communication sessions and for maintaining continuous communications with a moving wireless communication device commonly referred to as User Equipment (UE), and further provides connection to communication networks outside NG-RAN, e.g. the Internet.

With reference to FIG. 1, such a network may be embodied by a fifth generation (5G) Core Network (CN), being referred to as 5GC. FIG. 1 illustrates a simplified version of 5GC comprising core network nodes Access and Mobility Management Function (AMF) and User Plane Function (UPF).

The AMF 10, 12 is a core network control plane function configured to provide mobility management for providing UE-based authentication, authorization, mobility management, etc., while the UPF 11, 13 is a service function that processes user plane packets; processing may include altering the packet's payload and/or header, interconnection to data network(s), packet routing and forwarding, etc.

As further can be seen in FIG. 1, the NG-RAN comprises a plurality of radio base stations referred to as gNBs 14, 15, and LTE radio base stations referred to as ng-eNBs 16, 17.

The AMFs 10, 12 and UPFs 11, 13 connect to the radio base stations via a so-called NG interface, while the gNBs 14, 15 and ng-eNBs 16, 17 interconnect via an Xn interface.

A main task of a wireless communications network is to provide radio connections for UEs in order to enable services that users of the UEs wish to utilize. In this process, it is of utmost importance to find the most suitable cells or antenna beams of a radio base station for every UE as it moves.

Currently, this is achieved by requesting the UE to measure strength and quality of radio signals from the serving beams as well from neighbour beams. The results of the measurements are reported to one or more radio base stations in the RAN, which takes a decision on what cells/beams shall serve the UE in the following.

FIG. 2 illustrates a UE 18 being connected to a source radio base station 14 denoted gNB1 and providing three cells. Now, as the UE 18 moves toward a target radio base station 15 denoted gNB2 (also providing three cells), it will eventually be determined that the target radio base station 15 is better suited for serving the UE 18, and a handover of the UE 18 from the source radio base station gNB1 to the target radio base station gNB2 will be performed.

Such handover procedure is described in detail for instance in 3GPP technical specification TS 23.502, V15.2.0, in particular with reference to section 4.9, "Handover procedures" and FIG. 4.9.1.2.2-1—Xn based inter NG-RAN handover without UPF re-allocation.

With reference to FIG. 2, when the UE 18 does not send or receive data from the currently serving source base station 14 for some time, the source base station 14 typically disconnects the UE 18 from the RAN, and the UE 18 will move around with no supervision from the RAN. In this state, the RAN can store information about the UE 18, which enables a faster establishment of the connection once the UE 18 reconnects. This information, referred to as UE context, is in the current procedure stored in the source base station 14 and subsequently fetched by nodes requiring the information, for having the target base station 15 resume a connection having been released by the source base station 14, which is an inefficient procedure.

SUMMARY

An object of the present invention is to solve, or at least mitigate, this problem in the art and thus to provide and improved method of enabling a connection of a wireless communication device released by a source radio base station to be resumed by a target radio base station.

This object is attained in a first aspect of the invention by a method of a source radio base station of enabling a connection of a wireless communication device released by the source radio base station to be resumed by a target radio base station. The method comprises acquiring an indication that a connection established with the wireless communication device is to be released, identifying a target base station with which the connection to be released can be resumed for the wireless communication device, and transmitting, to the identified target base station, information required to resume the connection to be released by the source base station for the wireless communication device.

This object is attained in a second aspect of the invention by a method of a source radio base station configured to enable a connection of a wireless communication device released by the source radio base station to be resumed by a target radio base station. The source radio base station comprises a processing unit and a memory, said memory containing instructions executable by said processing unit, whereby the source radio base station is operative to acquire an indication that a connection established with the wireless communication device is to be released, identify a target base station with which the connection to be released can be resumed for the wireless communication device, and to transmit, to the identified target base station, information required to resume the connection to be released by the source base station for the wireless communication device.

This object is attained in a third aspect of the invention by a method of a target radio base station of enabling a connection of a wireless communication device released by a source radio base station to be resumed by the target base station. The method comprises receiving, from the source base station, information required to resume the connection to be released by the source base station for the wireless communication device after the source base station has determined that the connection to the wireless communication device is to be released and further has identified the target base station as a base station with which the connection can be resumed.

This object is attained in a fourth aspect of the invention by a target radio base station configured to enable a connection of a wireless communication device released by a source radio base station to be resumed by the target base station. The target radio base station comprising a processing unit and a memory, said memory containing instructions executable by said processing unit, whereby the target radio base station is operative to receive, from the source base station, information required to resume the connection to be released by the source base station for the wireless communication device after the source base station has determined that the connection to the wireless communication device is to be released and further has identified the target base station as a base station with which the connection can be resumed.

This object is attained in a fifth aspect of the invention by a method of a wireless communication device of enabling a connection released by a source radio base station for the wireless communication device to be resumed by a target base station. The method comprises receiving, from the source base station, a connection release message including an identifier associated with information required to resume the connection with the target base station.

This object is attained in a sixth aspect of the invention by a wireless communication device configured to enable a connection released by a source radio base station for the wireless communication device to be resumed by a target base station. The wireless communication device comprises a processing unit and a memory, said memory containing instructions executable by said processing unit, whereby the wireless communication device is operative to receive, from the source base station, a connection release message including an identifier associated with information required to resume the connection with the target base station.

Hence, the source base station acquires an indication that a connection established with the wireless communication device (referred to in the following as a UE) is to be released. Thereafter, the source base station identifies a target base station with which the connection to be released can be resumed for the UE.

For instance, in an embodiment, a current heading of the UE is estimated by observing movement of the UE. From this estimated heading, the source base station concludes that the UE is moving towards the target base station.

After the target base station has been identified, the source base station transmits, to the target base station, information required to resume the connection to be released by the source base station for the UE. In a 5G wireless communications network, this information is commonly referred to as "UE context".

Hence, before releasing the radio connection to the UE, the source base station transmits the UE context required by the target base station for the target base station to subsequently resume the released connection.

Advantageously, as compared to the prior art procedure of having the target base station fetch the UE context from the source base station before resuming the connection with the UE that is released by the source base station, the setup time for the resumed connection is greatly shortened when the UE connects with the identified target base station, which improves time-to-service and mitigates any need for data buffering in the network.

In an embodiment, the source radio base station receives the indication from the wireless communication device that the connection is to be released.

In an embodiment, the source radio base station estimates a current heading of the wireless communication device, wherein a closest adjacent radio base station located in said heading is identified to be the target base station with which the released connection is to be resumed.

In a further embodiment, the target radio base station associates an identifier with the information required to resume the connection to be released by the source base station, and transmits, to the source base station, the identifier associated with the information required to resume the connection to be released by the source base station, for forwarding to the wireless communication device in a connection release message.

In an embodiment, the source radio base station receives, from the identified target base station, an instruction to release the UE context for the wireless communication device.

In yet an embodiment, the identifier associated with the information required to resume the connection to be released by the source base station is an Inactive Radio Network Temporary Identifier (I-RNTI).

In another embodiment, the source radio base station transmits a message to the wireless communication device that the connection with the source base station is released, the message including the identifier associated with the information required to resume the connection received from the target base station.

In an embodiment, the target radio base station transmits, to a network node configured to provide mobility management, a request to switch connection of the wireless communication device from the source base station to the target base station.

In another embodiment, the target radio base station receives, from the network node configured to provide mobility management, a confirmation that the connection of the wireless communication device is switched from the source base station to the target base station.

In another embodiment, the target radio base station receives, from the wireless communication device, a request to resume the connection released by the source base station, the request comprising said identifier, and resumes the connection with the wireless communication device.

Further embodiments will be discussed in the following.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
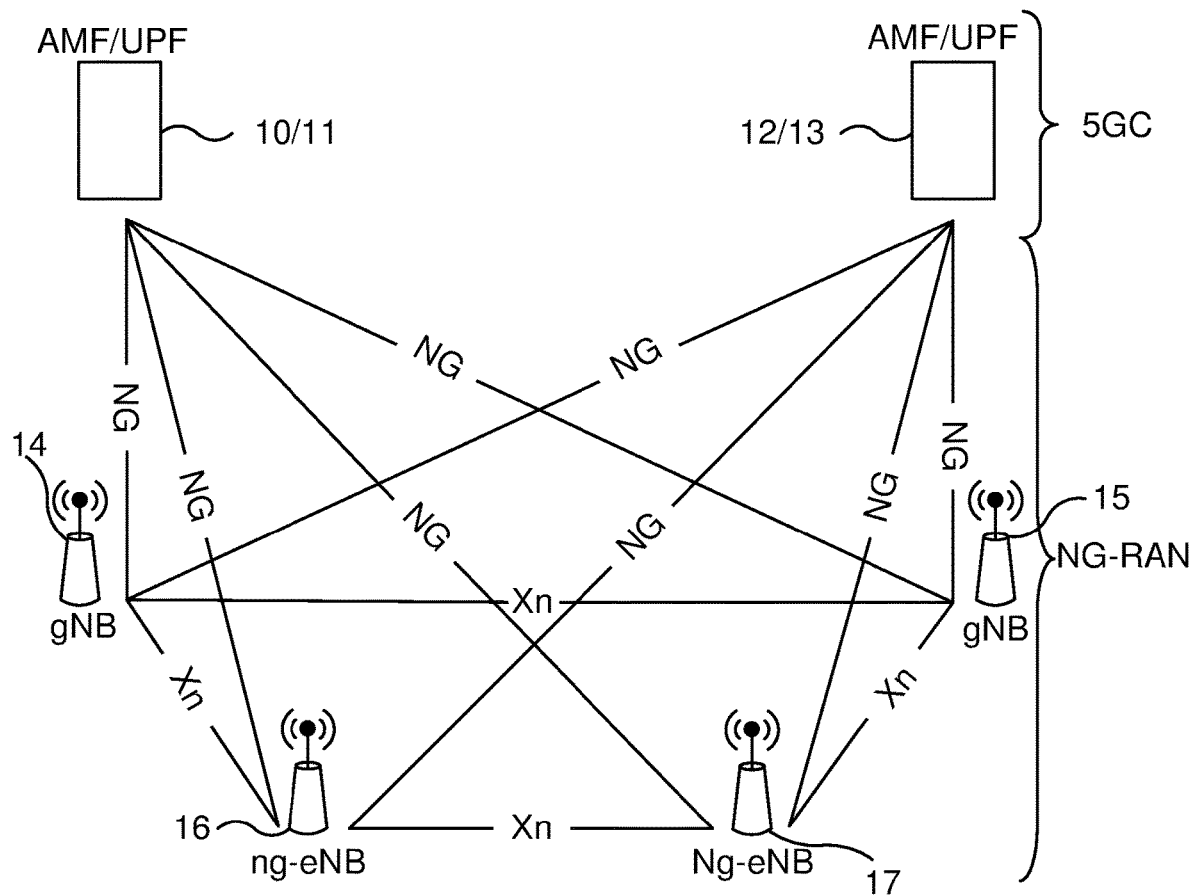
FIG. 1 illustrates a prior art 5G wireless communications network in which the invention may be applied.

FIG. 1 illustrates a prior art 5G wireless communications network in which the invention may be applied. FIG. 1 has previously been discussed and will not be discussed in further detail.

Figure 2:
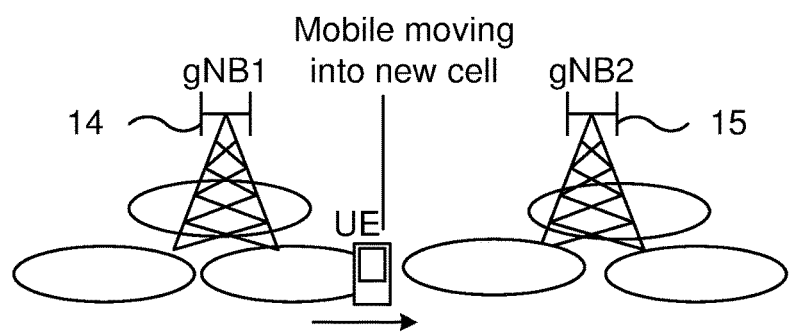
FIG. 2 illustrates a handover of a UE in a prior art 5G wireless communications network.

FIG. 2 illustrates a handover of a UE in a prior art 5G wireless communications network.

With reference to FIG. 2, as previously has been discussed, when the UE 18 does not send or receive data from the currently serving source base station 14 for some time, the source base station 14 typically disconnects the UE 18 from the RAN, and the UE 18 will move around with very little supervision from the RAN, entering a Radio Resource Control (RRC) state referred to as RRC_INACTIVE.

In this state, the RAN can store information about the UE 18, which enables a faster establishment of the connection once the UE 18 reconnects. This information, referred to as UE context, is in the art stored in the source base station 14 and subsequently fetched by nodes requiring the information to resume the connection between the RAN and the UE, which is an inefficient procedure.

Figure 3:
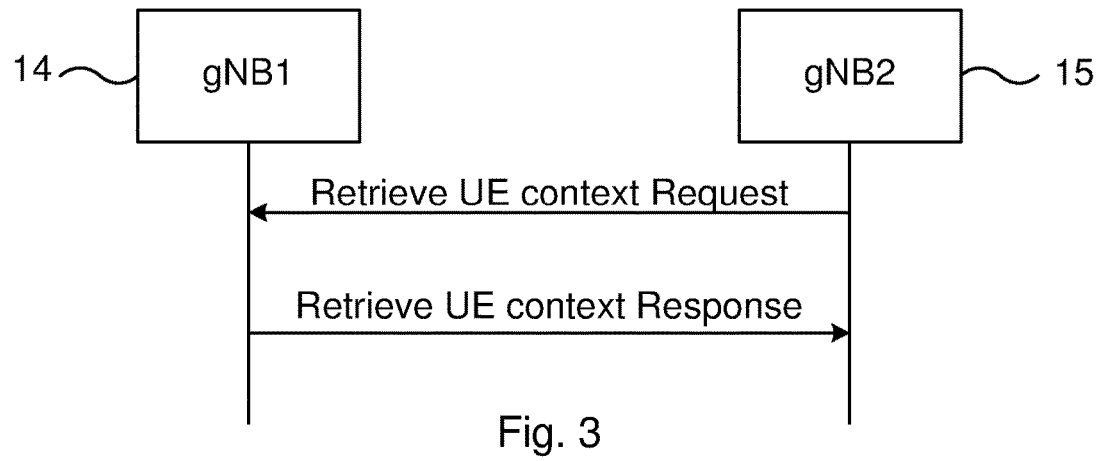
FIG. 3 illustrates the prior art procedure where a target base station initiates a context fetch procedure by sending a Retrieve UE Context Request message to a source base station.

FIG. 3 illustrates the prior art procedure where the target base station 15 (gNB2) initiates the procedure by sending a Retrieve UE Context Request message to the source base station 14 (gNB1). The Retrieve UE Context Request message contains a Resume ID to identify the UE Context of the particular UE 18 for which the request is made. If the source base station 14 is able to identify and verify the UE context, it shall respond to the target base station 15 with the Retrieve UE Context Response message which contains the UE Context.

If the source base station 14 is not able to identify the UE context, it shall respond with the Retrieve UE Context Failure message to inform the target base station 15 that the Retrieve UE Context procedure has failed.

When a UE 18 reconnects with a target base station 15 being different from the source base station 14 with which it previously disconnected, in which the UE context is stored, the retrieval of the UE context by the target base station 15 from the source base station 14 will delay the setup of the connection between the UE 18 and the target base station 15.

Additionally, if the UE 18 has moved further away from the source base station 14, the target base station 15 may not have a connection to the source base station 14 allowing retrieval of the UE context. If so, the UE 18 has to perform a new connection setup towards the core network, which will even further delay the connection of the UE 18 to the target base station 15.

Figure 4:
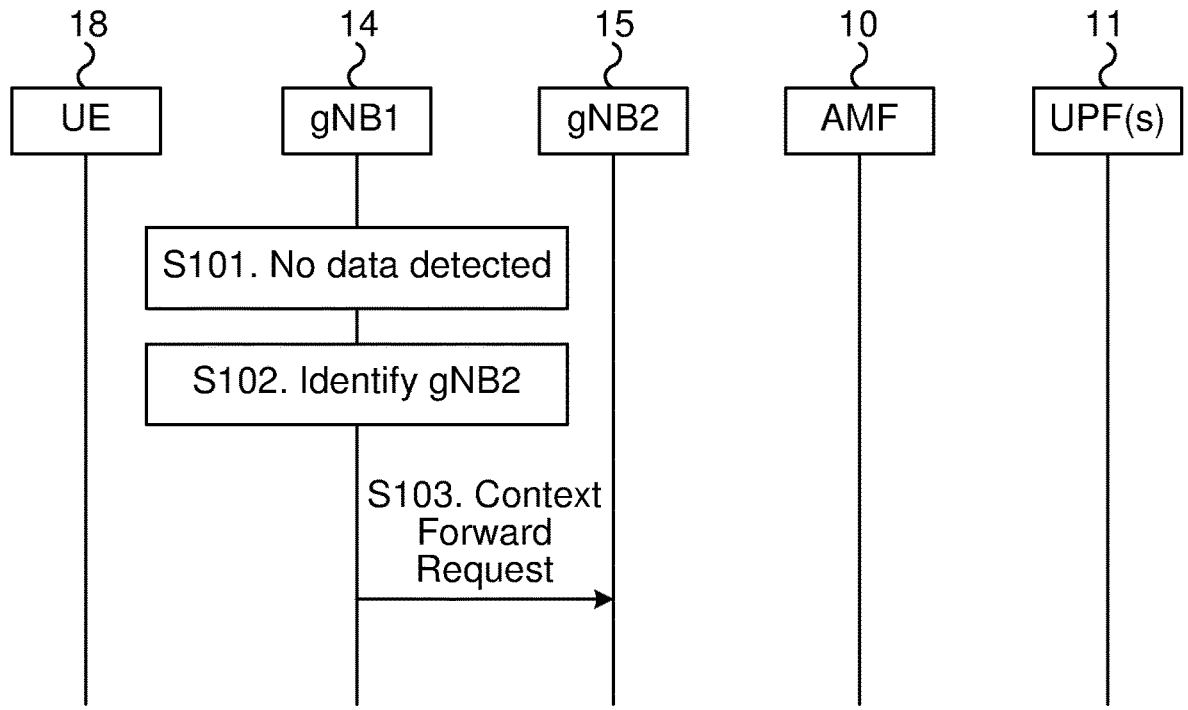
FIG. 4 shows a signalling diagram illustrating a method of enabling a connection of a wireless communication device released by a source radio base station to be resumed by a target base station according to an embodiment.

FIG. 4 shows a signalling diagram illustrating a method of enabling a connection of a wireless communication device 18 released by a source radio base station 14 (gNB1) to be resumed by a target base station 15 (gNB2) according to an embodiment. The wireless communication device 18 will be referred to in the following as a UE.

In a first step S101, the source base station 14 acquires an indication that a connection established with the UE 18 is to be released. The source base station 14 may for instance detect that the UE 18 does not send any data (and may not have done so for some time).

Thereafter, in step S102, the source base station 14 identifies a target base station 15 with which the connection to be released can be resumed for the UE 18.

For instance, in an embodiment, a current heading of the UE 18 is estimated by observing movement of the UE 18. From this estimated heading, the source base station 14 concludes that the UE 18 is moving towards the target base station 15. It is noted that various measurements may be performed to determine the heading of the UE 18, such as signal strength, and further the UE 18 itself may report measurement data based on which the source base station 18 may estimate the UE heading.

After the target base station 15 has been identified, the source base station 14 transmits in step S103, to the target base station 15, information required to resume the connection to be released by the source base station 14 for the UE in a Context Forward Request message. In a 5G wireless communications network, this information is commonly referred to as "UE context", and comprises i.a. UE RRC state information, security information, UE capability information, etc.

Hence, in this embodiment, before releasing the radio connection to the UE 18, the source base station 14 transmits the UE context required by the target base station 15 for the target base station to subsequently resume the released connection.

It should be noted that the UE 18 is in the RRC_INACTIVE state after release where the UE 18 may stay for several seconds or even minutes and once the UE 18 resumes its connection, the UE context has already been moved and its connection with the source base station 14 has been switched to the target base station 15.

Advantageously, as compared to the prior art procedure of having the target base station 15 fetch the UE context from the source base station 14 before resuming the connection with the UE 18 that is released by the source base station 14, the setup time for the resumed connection is greatly shortened when the UE 18 connects with the identified target base station 15, which improves time-to-service and mitigates any need for data buffering in the network.

Figure 5A:
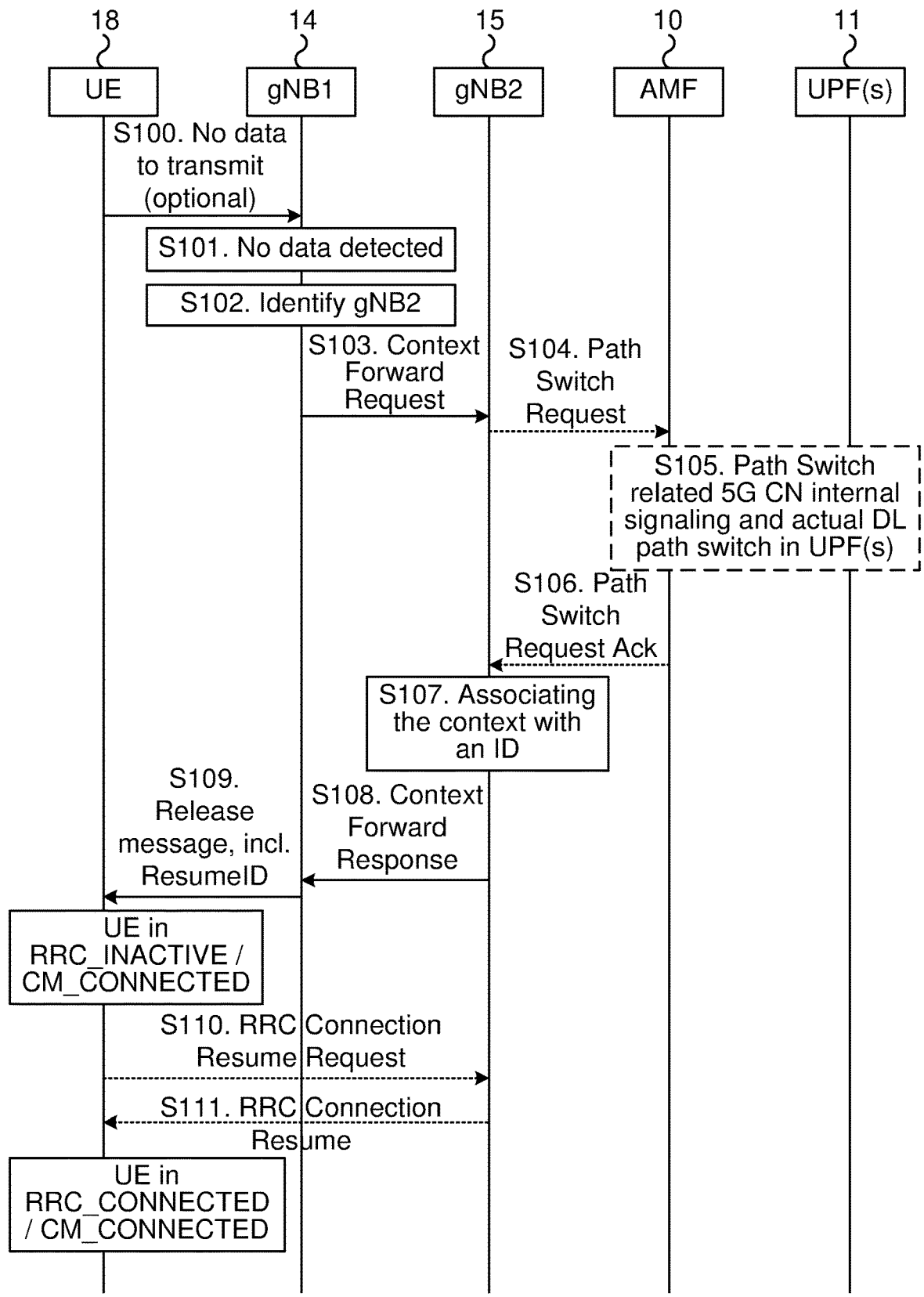
FIG. 5a shows a signalling diagram illustrating a method of enabling a connection of a wireless communication device released by a source radio base station to be resumed by a target base station according to a further embodiment.

FIG. 5a shows a signalling diagram illustrating a method of enabling a connection of the UE 18 released by the source radio base station 14 (gNB1) to be resumed by the target base station 15 (gNB2) according to a further embodiment.

The steps S101-S103 are identical to those already described with reference to FIG. 4. Steps and actions indicated with dotted lines are also performed in the prior art. However, it should be noted that in the art steps S104-S106 are performed at a later stage in connection to performing steps S110 and S111.

FIG. 5a further illustrates with step S100 that the UE 18 itself may signal to the source base station 14 that the connection is to be released.

Upon the target base station 15 receiving the information required to resume the connection with the UE 18—i.e. the UE context—from the source base station 14 in step S103, the target base station 15 transmits a request to switch connection of the UE 18 between the 5GC and the NG-RAN from the source base station 14 to the target base station 15, to a network node 10 configured to provide mobility management in step S104, in this exemplifying embodiment in the form of an AMF.

Hence, the target base station 15 transmits a Path Switch Request message requesting the AMF 10 to move the connection of the UE 18 from the source base station 14 to the target base station 15.

The AMF 10 will co-operate in step S105 with the UPF 11 to trigger 5GC to switch a downlink data path towards the target base station 15 and to establish an NG-C interface (i.e. a control plane interface between NG-RAN and 5GC) instance towards the target base station 15, and the 5GC will switch the downlink data path towards the target base station 15.

The AMF 10 may further transmit a Path Switch Request Ack message in step S106 indicating to the target base station 15 that the path switch is acknowledged.

Thereafter, the target base station 15 associates, in step S107, an identifier with the UE context that was received from the source base station 14 in step S103. In an embodiment, the identifier is a so called Inactive Radio Network Temporary Identifier (I-RNTI).

The I-RNTI is transmitted in step S108 to the source base station 14 in a Context Forward Response message for subsequent forwarding to the UE 18 in a connection release message.

Further in an embodiment, the message in step S108 comprises a notification to the source base station 14 that the UE context can be released, in response to which the source base station 14 can release radio and control plane related resources associated with the UE context. Advantageously, since no service is ongoing between the UE 18 and the source base station 15, only the UE context is forwarded to the identified target base station 15, and the UE 18 is sent an identifier which uniquely identifies the UE context before the radio connection to the UE 18 is released. With the unique identifier—exemplified in the form of the I-RNTI—the UE 18 is informed of where its UE context is located and the target base station 15 is able to identify the UE context for this particular UE 18. It should be noted that no radio resources need to be allocated; only the Resume ID (i.e. the I-RNTI) for the UE context is transmitted.

Hence, the source base station 14 transmits a message to the UE 18 in step S109 thereby releasing the connection with the UE 18, which message includes the I-RNTI and possibly the cause for the release. This message may e.g. be embodied in the form of an RRC Release message or an RRC Connection Reconfiguration message. The UE 18 will thus transit from RRC_ACTIVE state to RRC_INACTIVE state upon receiving the message comprising the I-RNTI in step S109.

The UE 18 which now is in the RRC_INACTIVE state will in step S110 transmit a request to resume the connection previously established with the source base station 14 in the form of an RRC Connection Resume Request message, which includes the I-RNTI.

In response thereto, the target base station 15 will internally fetch the UE context associated with the received I-RNTI and resume the connection with the UE 18 by transmitting an RRC Connection Resume message in step S111.

As previously mentioned, in the art, the step S104-S106 are in contrast performed just prior to step S110.

Upon receiving the message in step S111 the UE 18 will enter RRC_CONNECTED state.

Advantageously, since the target base station 15 already received the UE context in step S103 and performed the path switch in steps S104-S106, there is no need to fetch the context with a Retrieve UE Context procedure as was described with reference to FIG. 3 upon receiving the request in step S110, nor is it needed to perform a path switch; instead the connection can be resumed immediately.

Figure 5B:
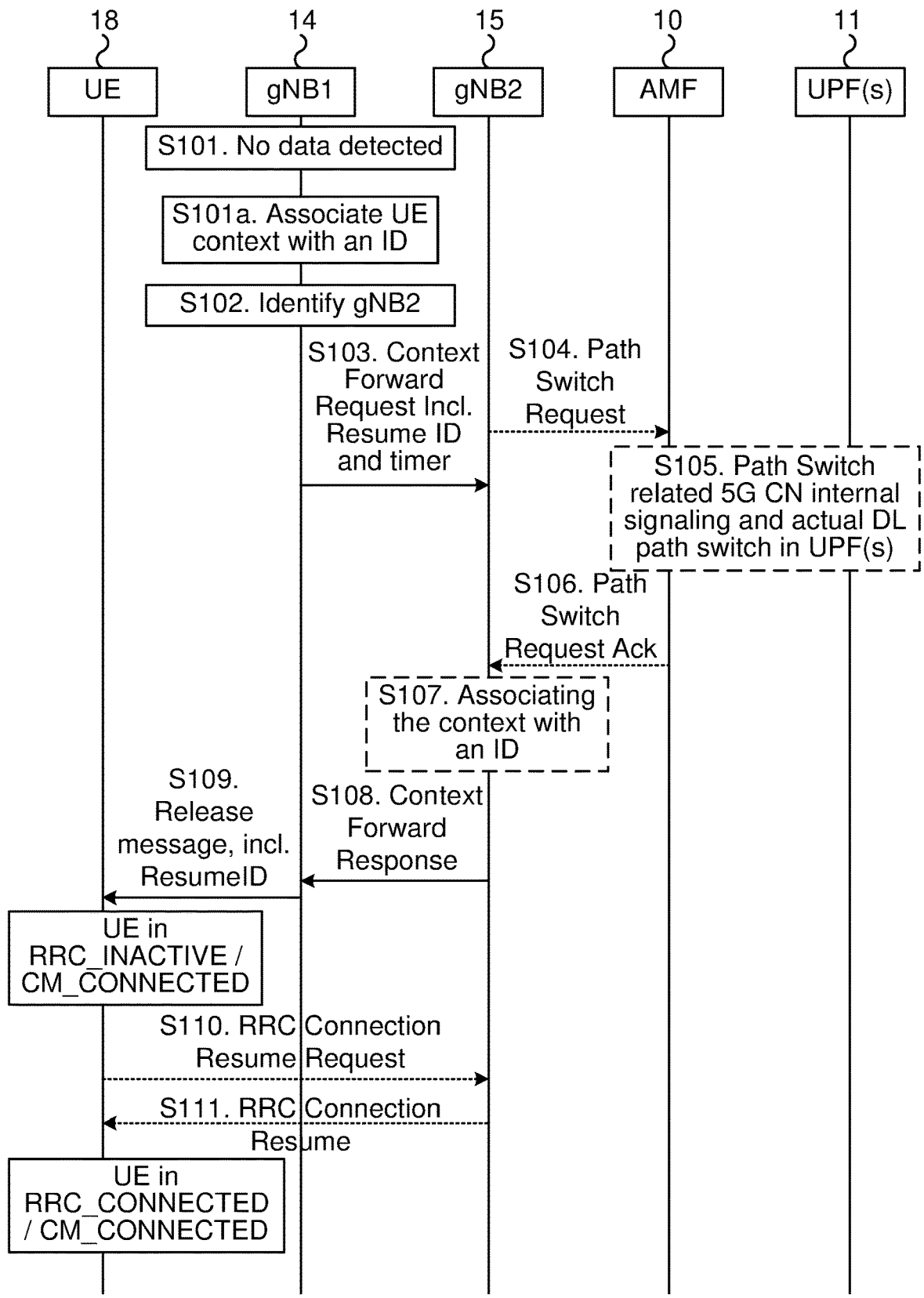
FIG. 5b shows a signalling diagram illustrating a method of enabling a connection of a wireless communication device released by a source radio base station to be resumed by a target base station according to another embodiment.

FIG. 5b shows a signalling diagram illustrating a method of enabling a connection of the UE 18 released by the source radio base station 14 (gNB1) to be resumed by the target base station 15 (gNB2) according to a further embodiment.

In this particular embodiment, after having detected that no more data is to be transferred by the UE 18 in step S101, the source base station 14 allocates in step S101a an identifier (e.g. the I-RNTI) with the UE context to be transmitted to the target base station 15 in step S103.

By having the source base station 14 assign the I-RNTI, the UE context can advantageously be sent to several potential target base stations as identified by the source base station 15 in step S102 (even though only one single target base station subsequently will effect a path switch, in this example gNB2).

Along with the information required to resume the connection with the UE 18—i.e. the UE context—sent from the source base station 14 in step S103 to one or more potential target base stations a UE context release timer is included, which has the advantage that the I-RNTI which is allocated by the source base station 14 subsequently can be re-used for another UE upon expiration of the UE context release timer.

In this example, the target base station 15 (gNB2) is the base station performing the path switch. As previously mentioned, only one potential target base station 15 can perform the path switch. Optionally, this may be indicated by the source base station 14 to the target base station 15 upon transmitting the UE context in step S103.

Similarly to FIG. 5a, in step S104, the target base station 15 transmits a request to switch connection of the UE 18 between the 5GC and the NG-RAN from the source base station 14 to the target base station 15, to a network node 10 configured to provide mobility management, in this exemplifying embodiment in the form of an AMF.

Hence, the target base station 15 transmits a Path Switch Request message requesting the AMF 10 to move the connection of the UE 18 from the source base station 14 to the target base station 15.

The AMF 10 will co-operate in step S105 with the UPF 11 to trigger 5GC to switch a downlink data path towards the target base station 15 and to establish an NG-C interface (i.e. a control plane interface between NG-RAN and 5GC)

instance towards the target base station 15, and the 5GC will switch the downlink data path towards the target base station 15.

The AMF 10 may further transmit a Path Switch Request Ack message in step S106 indicating to the target base station 15 that the path switch is acknowledged.

Optionally, should the Context Forward Request of step S103 not contain an identifier in the form of an I-RNTI but only a UE context release timer (as well as the UE context), the target base station 15 associates the received UE context with an I-RNTI in step 107 and transmits the I-RNTI in step S108 as previously described with reference to FIG. 5*a*.

However, in this exemplifying embodiment, since the source base station 14 indeed did assign the I-RNTI to the UE context in step S101*a*, the target base station 15 will not perform step S107, and the Context Forward Response message of step S108 will basically be an acknowledgement that the path switch is performed.

The source base station 14 transmits a message to the UE 18 in step S109 thereby releasing the connection with the UE 18, which message includes the I-RNTI and possibly the cause for the release. The UE 18 will thus transit from RRC_ACTIVE state to RRC_INACTIVE state upon receiving the message comprising the I-RNTI in step S109.

Advantageously, the UE 18 is sent an identifier which uniquely identifies the UE context before the radio connection to the UE 18 is released. With the unique identifier—exemplified in the form of the I-RNTI—the UE 18 is informed of where its UE context was allocated and the target base station 15 that has already received the UE context is able to identify the UE context for this particular UE 18. It should be noted that no radio resources need to be allocated; only the Resume ID (i.e. the I-RNTI) for the UE context is transmitted.

The UE 18 which now is in the RRC_INACTIVE state will in step S110 transmit a request to resume the connection previously established with the source base station 14 in the form of an RRC Connection Resume Request message, which includes the I-RNTI.

In response thereto, the target base station 15 will internally fetch the UE context associated with the received I-RNTI and resume the connection with the UE 18 by transmitting an RRC Connection Resume message in step S111.

As previously mentioned, in the art, the step S104-S106 are in contrast performed just prior to step S110.

Upon receiving the message in step S111 the UE 18 will enter RRC_CONNECTED state.

Advantageously, since the target base station 15 already received the UE context in step S103 and performed the path switch in steps S104-S106, there is no need to fetch the context with a Retrieve UE Context procedure as was described with reference to FIG. 3 upon receiving the request in step S110, nor is it needed to perform a path switch; instead the connection can be resumed immediately. In case the path switch has not been performed to the target base station, the path switch is performed when the UE resumes the connection with steps S110-S111.

Further advantageous is that when the connection has been resumed or the context release timer has expired, the I-RNTI can be re-used for another UE.

Figure 6:
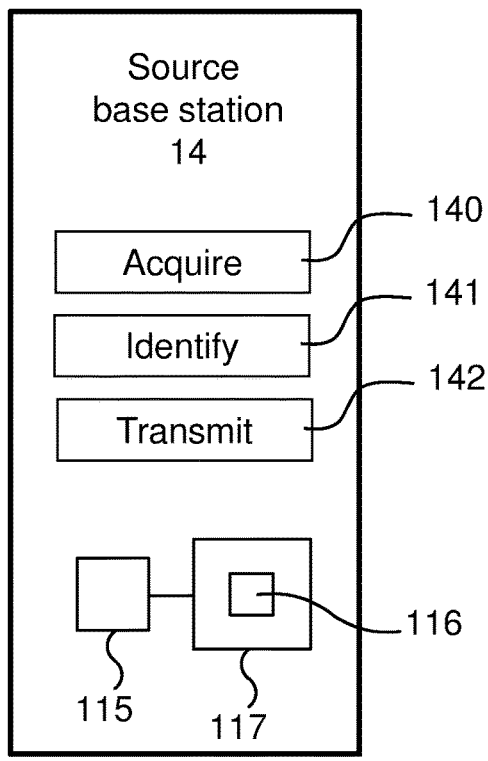
FIG. 6 shows a source radio base station according to an embodiment.

FIG. 6 illustrates a source radio base station 14 according to an embodiment. The steps of the method performed by the source radio base station 14 of enabling a connection of a wireless communication device released by the source radio base station 14 to be resumed by a target radio base station according to embodiments are in practice performed by a processing unit 115 embodied in the form of one or more microprocessors arranged to execute a computer program 116 downloaded to a suitable storage volatile medium 117 associated with the microprocessor, such as a Random Access Memory (RAM), or a non-volatile storage medium such as a Flash memory or a hard disk drive. The processing unit 115 is arranged to cause the source radio base station 14 to carry out the method according to embodiments when the appropriate computer program 116 comprising computer-executable instructions is downloaded to the storage medium 117 and executed by the processing unit 115. The storage medium 117 may also be a computer program product comprising the computer program 116. Alternatively, the computer program 116 may be transferred to the storage medium 117 by means of a suitable computer program product, such as a Digital Versatile Disc (DVD) or a memory stick. As a further alternative, the computer program 116 may be downloaded to the storage medium 117 over a network. The processing unit 115 may alternatively be embodied in the form of a digital signal processor (DSP), an application specific integrated circuit (ASIC), a field-programmable gate array (FPGA), a complex programmable logic device (CPLD), etc.

The source base station 14 comprises acquiring means 140 adapted to acquire an indication that a connection established with the wireless communication device is to be released, identifying means 141 adapted to identify a target base station with which the connection to be released can be resumed for the wireless communication device, and transmitting means adapted to transmit, to the identified target base station, information required to resume the connection to be released by the source base station 14 for the wireless communication device.

The means 140-142 may comprise communication interface(s) for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

Figure 7:
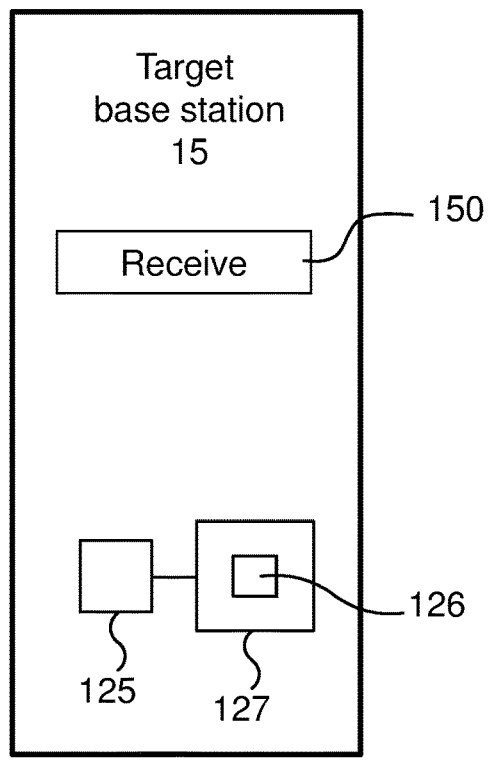
FIG. 7 shows a target radio base station according to an embodiment.

FIG. 7 illustrates a target radio base station 15 according to an embodiment. The steps of the method performed by the target radio base station 15 of enabling a connection of a wireless communication device released by a source radio base station to be resumed by the target radio base station 15 according to embodiments are in practice performed by a processing unit 125 embodied in the form of one or more microprocessors arranged to execute a computer program 126 downloaded to a suitable storage volatile medium 127 associated with the microprocessor, such as a RAM, or a non-volatile storage medium such as a Flash memory or a hard disk drive. The processing unit 125 is arranged to cause the target radio base station 15 to carry out the method according to embodiments when the appropriate computer program 126 comprising computer-executable instructions is downloaded to the storage medium 127 and executed by the processing unit 125. The storage medium 127 may also be a computer program product comprising the computer program 126. Alternatively, the computer program 126 may be transferred to the storage medium 127 by means of a suitable computer program product, such as a DVD or a memory stick. As a further alternative, the computer program 126 may be downloaded to the storage medium 127 over a network. The processing unit 125 may alternatively be embodied in the form of a DSP, an ASIC, an FPGA, a CPLD, etc.

The target base station 15 comprises receiving means 140 adapted to receive, from the source base station, information required to resume the connection to be released by the source base station for the wireless communication device after the source base station has determined that the connection to the wireless communication device is to be released and further identified the target base station 15 as a base station with which the connection can be resumed.

The means 150 may comprise communication interface(s) for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

Figure 8:
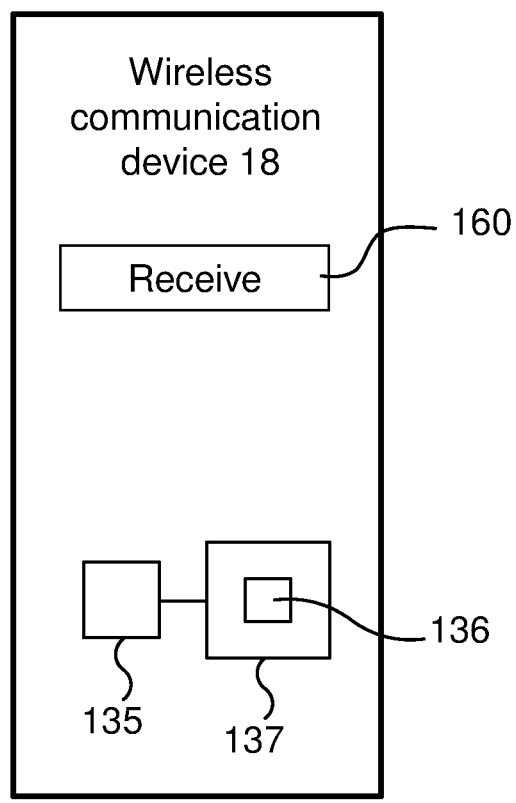
FIG. 8 shows a wireless communication device according to an embodiment.

FIG. 8 illustrates a wireless communication device 18 according to an embodiment. The steps of the method performed by the wireless communication device 18 of enabling a connection of the wireless communication device 18 released by a source radio base station to be resumed by a target radio base station according to embodiments are in practice performed by a processing unit 135 embodied in the form of one or more microprocessors arranged to execute a computer program 136 downloaded to a suitable storage volatile medium 137 associated with the microprocessor, such as a RAM, or a non-volatile storage medium such as a Flash memory or a hard disk drive. The processing unit 135 is arranged to cause the wireless communication device 18 to carry out the method according to embodiments when the appropriate computer program 136 comprising computer-executable instructions is downloaded to the storage medium 137 and executed by the processing unit 135. The storage medium 137 may also be a computer program product comprising the computer program 136. Alternatively, the computer program 136 may be transferred to the storage medium 137 by means of a suitable computer program product, such as a DVD or a memory stick. As a further alternative, the computer program 136 may be downloaded to the storage medium 137 over a network. The processing unit 135 may alternatively be embodied in the form of a DSP, an ASIC, an FPGA, a CPLD, etc.

The wireless communication device 18 comprises receiving means 160 adapted to receive, from the source base station, a connection release message including an identifier associated with information required to resume the connection with the target base station.

The means 160 may comprise communication interface(s) for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of a source radio base station of enabling a connection of a wireless communication device released by the source radio base station to be resumed by a target radio base station, the method comprising:
    acquiring an indication that a connection established with the wireless communication device is to be released;
    estimating a current heading of the wireless communication device;
    identifying a target base station with which the connection to be released can be resumed for the wireless communication device, wherein a closest adjacent radio base station located in said heading is identified to be the target base station with which the released connection is to be resumed;
    transmitting, to the identified target base station, information required to resume the connection to be released by the source base station for the wireless communication device;
    receiving, from the target base station, an identifier associated with the information required to resume the connection to be released by the source base station; and
    in response to receiving the identifier from the target base station, transmitting, to the wireless communication device, the identifier in a connection release message.

2. The method of claim 1, wherein the acquiring of an indication that the connection established with the wireless communication device is to be released comprises:
    receiving the indication from the wireless communication device that the connection is to be released.

3. The method of claim 1, wherein the information required to resume the connection to be released by the source base station comprises User Equipment, UE, context of the wireless communication device.

4. The method of claim 1, wherein the transmission of the information required to resume the connection to be released by the source base station contains a timer specifying for how long time the target base station shall save said information.

5. The method of claim 1, wherein the transmission of the information required to resume the connection to be released by the source base station contains an indicator specifying if a path switch request shall be triggered or not by the target base station.

6. The method of claim 1, further comprising:
    receiving, from the identified target base station, an instruction to release a UE context for the wireless communication device.

7. The method of claim 1, the identifier associated with the information required to resume the connection to be released by the source base station being an Inactive Radio Network Temporary Identifier, I-RNTI.

8. A method of a target radio base station of enabling a connection of a wireless communication device released by a source radio base station to be resumed by the target base station, the method comprising:
    receiving, from the source base station and prior to receiving a resume request from the wireless communication device, information required to resume the connection to be released by the source base station for the wireless communication device after the source base station has determined that the connection to the wireless communication device is to be released and further has identified the target base station as a base station with which the connection can be resumed;
    associating an identifier with the information required to resume the connection to be released by the source base station; and
    in response to associating the identifier with the information required to resume the connection to be released by the source base station, transmitting, to the source base station, the identifier associated with the information required to resume the connection to be released by the source base station, for forwarding to the wireless communication device in a connection release message.

9. The method of claim 8, further comprising:
transmitting, to a network node configured to provide mobility management, a request to switch connection of the wireless communication device from the source base station to the target base station.

10. The method of claim 9, further comprising:
receiving, from the network node configured to provide mobility management, a confirmation that the connection of the wireless communication device is switched from the source base station to the target base station.

11. The method of claim 8, further comprising:
receiving, from the wireless communication device, a request to resume the connection released by the source base station, the request comprising said identifier; and
resuming the connection with the wireless communication device.

12. A source radio base station configured to enable a connection of a wireless communication device released by the source radio base station to be resumed by a target radio base station, the source radio base station comprising a processing unit and a memory, said memory containing instructions executable by said processing unit, whereby the source radio base station is operative to:
acquire an indication that a connection established with the wireless communication device is to be released;
estimate a current heading of the wireless communication device;
identify a target base station with which the connection to be released can be resumed for the wireless communication device, wherein a closest adjacent radio base station located in said heading is identified to be the target base station with which the released connection is to be resumed;
transmit, to the identified target base station, information required to resume the connection to be released by the source base station for the wireless communication device;
receiving, from the target base station, an identifier associated with the information required to resume the connection to be released by the source base station; and
in response to receiving the identifier from the target base station, transmitting, to the wireless communication device, the identifier in a connection release message.

13. The source radio base station of claim 12, further being operative to, when acquiring an indication that the connection established with the wireless communication device is to be released:
receiving the indication from the wireless communication device that the connection is to be released.

14. The source radio base station of claim 12, wherein the information required to resume the connection to be released by the source base station comprises User Equipment, UE, context of the wireless communication device.

15. The source radio base station of claim 12, further being operative to include, with the transmission of the information required to resume the connection to be released by the source base station, a timer specifying for how long time the target base station shall save said information.

* * * * *